(12) United States Patent
Gao et al.

(10) Patent No.: US 12,273,820 B2
(45) Date of Patent: Apr. 8, 2025

(54) PHASE TRACKING REFERENCE SIGNALING FOR A WIRELESS COMMUNICATION NETWORK

(71) Applicant: Telefonaktiebolaget LM Ericsson (publ), Stockholm (SE)

(72) Inventors: Shiwei Gao, Nepean (CA); Stephen Grant, Pleasanton, CA (US); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/212,928

(22) Filed: Mar. 25, 2021

(65) Prior Publication Data

US 2022/0312334 A1 Sep. 29, 2022

(51) Int. Cl.
H04W 52/34 (2009.01)
H04L 1/00 (2006.01)
H04L 5/00 (2006.01)
H04W 52/14 (2009.01)
H04W 52/24 (2009.01)

(52) U.S. Cl.
CPC ......... H04W 52/146 (2013.01); H04L 1/0003 (2013.01); H04L 5/0051 (2013.01); H04W 52/241 (2013.01)

(58) Field of Classification Search
CPC .......... H04L 5/00; H04L 12/28; H04L 43/08; H04W 72/04; H04W 48/12; H04W 52/16; H04B 7/0413; H04B 7/0452
See application file for complete search history.

(56) References Cited

U.S. PATENT DOCUMENTS

| 2019/0296877 | A1* | 9/2019 | Zhang | H04L 5/0048 |
| 2019/0305908 | A1* | 10/2019 | Lee | H04L 5/0035 |
| 2020/0252878 | A1 | 8/2020 | Zhang et al. | |
| 2021/0014021 | A1* | 1/2021 | Hunukumbure | H04W 72/04 |

FOREIGN PATENT DOCUMENTS

EP    3697142 A1    8/2020

OTHER PUBLICATIONS

3GPP TS 38.214 V16.4.0; 3rd Generation Partnership Project; Technical Specification Group Radio Access Network; NR; Physical layer procedures for data (Release 16), Dec. 2020, consisting of 169-pages.

International Search Report and Written Opinion dated Jan. 3, 2022 for International Application No. PCT/SE2021/050791 filed Aug. 13, 2021, consisting of 14 pages.

(Continued)

*Primary Examiner* — Tu X Nguyen
(74) *Attorney, Agent, or Firm* — Weisberg I.P. Law, P.A.

(57) ABSTRACT

There is disclosed a method of operating a receiving radio node in a wireless communication network. The method includes receiving signaling based on evaluating Phase Tracking Reference Signaling, PTRS, associated to the signaling, wherein evaluating is based on assuming a power level of PTRS relative to associated data signaling based on the number or PTRS ports and/or transmission sources for the signaling indicated to the receiving radio node. The disclosure also pertains to related devices and methods.

13 Claims, 3 Drawing Sheets

(56) References Cited

OTHER PUBLICATIONS

3GPP TSG RAN WG1 Meeting #93 R1-1806285; Title: Remaining issues on PT-RS; Source: CATT; Agenda Item: 7.1.2.3.4; Document for: Discussion and Decision; Location and Date: Busan, Korea, May 21-25, 2018, consisting of 6 pages.
3GPP TSG RAN WG1 Meeting AH 1801 R1-1800246; Title: Remaining issues on PT-RS; Source: CATT; Agenda Item: 7.2.3.4; Document for: Discussion and Decision; Location and Date: Vancouver, Canada, Jan. 22-26, 2018, consisting of 5 pages.

* cited by examiner

PHASE TRACKING REFERENCE SIGNALING FOR A WIRELESS COMMUNICATION NETWORK

TECHNICAL FIELD

This disclosure pertains to wireless communication technology, in particular for high frequencies.

BACKGROUND

For future wireless communication systems, use of higher frequencies is considered, which allows large bandwidths to be used for communication. However, use of such higher frequencies brings new problems, for example regarding physical properties and timing. Ubiquitous or almost ubiquitous use of beamforming and/or the use of multiple TRPs having simultaneous communication links with one wireless device, with often comparatively small beams, may provide additional complications that need to be addressed.

SUMMARY

It is an object of this disclosure to provide improved approaches of handling wireless communication, in particular regarding reference signaling. The approaches described are particularly suitable for millimeter wave communication, in particular for radio carrier frequencies around and/or above 52.6 GHz, which may be considered high radio frequencies (high frequency) and/or millimeter waves. The carrier frequency/ies may be between 52.6 and 140 GHz, e.g. with a lower border between 52.6, 55, 60, 71 GHz and/or a higher border between 71, 72, 90, 114, 140 GHz or higher, in particular between 55 and 90 GHz, or between 60 and 72 GHz; however, higher frequencies may be considered, in particular frequency of 71GHz or 72GHz or above, and/or 100 GHz or above, and/or 140 GHz or above. The carrier frequency may in particular refer to a center frequency or maximum frequency of the carrier. The radio nodes and/or network described herein may operate in wideband, e.g. with a carrier bandwidth of 1 GHz or more, or 2 GHz or more, or even larger, e.g. up to 8 GHz; the scheduled or allocated bandwidth may be the carrier bandwidth, or be smaller, e.g. depending on channel and/or procedure. In some cases, operation may be based on an OFDM waveform or a SC-FDM (also referred to as DFT-s-waveform), for example for downlink and/or uplink, in particular a FDF-SC-FDM-based waveform. However, operation based on a single carrier waveform, e.g. SC-FDE (which may be pulse-shaped or Frequency Domain Filtered, e.g. based on modulation scheme and/or MCS), may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam. Operation may be based on and/or associated to a numerology, which may indicate a subcarrier spacing and/or duration of an allocation unit and/or an equivalent thereof, e.g., in comparison to an OFDM based system. A subcarrier spacing or equivalent frequency interval may for example correspond to 960 kHZ, or 1920 kHz, e.g. representing the bandwidth of a subcarrier or equivalent.

The approaches are particularly advantageously implemented in a future 6$^{th}$ Generation (6 G) telecommunication network or 6 G radio access technology or network (RAT/ RAN), in particular according to 3GPP (3$^{rd}$ Generation Partnership Project, a standardisation organization). A suitable RAN may in particular be a RAN according to NR, for example release 17 or later, or LTE Evolution. However, the approaches may also be used with other RAT, for example future 5.5G systems or IEEE based systems. It may be considered that the RAN and/or a radio node is operating in an unlicensed frequency band (or carrier or part thereof, also referred to as license-exempt) and/or based on a LBT or channel assessment procedure to access (for transmission) the frequency band (or carrier or part thereof), for example in a License Assisted Access (LAA) operation mode and/or in the context of NR-U (NR unlicensed).

There is disclosed a method of operating a receiving radio node in a wireless communication network. The method comprises receiving signaling based on evaluating Phase Tracking Reference Signaling, PTRS, associated to the signaling. Evaluating is based on assuming a power level of PTRS relative to associated data signaling based on the number or PTRS ports and/or transmission sources for the signaling indicated to the receiving radio node.

A receiving radio node for a wireless communication network is described. The receiving radio node is adapted for receiving signaling based on evaluating Phase Tracking Reference Signaling, PTRS, associated to the signaling. Evaluating is based on assuming a power level of PTRS relative to associated data signaling based on the number or PTRS ports and/or transmission sources for the signaling indicated to the receiving radio node.

There is also proposed a method of operating a transmitting radio node in a wireless communication network. The method comprises transmitting signaling comprising Phase Tracking Reference Signaling, PTRS, wherein the relative power level of the PTRS to associated data signaling of the signaling is based on the number of PTRS ports and/or transmission sources used for transmitting the signaling.

A transmitting radio node for a wireless communication network is considered. The transmitting radio node is adapted for transmitting signaling comprising Phase Tracking Reference Signaling, PTRS, wherein the relative power level of the PTRS to associated data signaling of the signaling is based on the number of PTRS ports and/or transmission sources used for transmitting the signaling.

Receiving signaling based on evaluating PTRS associated to the signaling may comprise and/or be based on phase noise estimation and/or correction for common phase error and/or inter carrier interference (CPE and/or ICI) based on the PTRS, which may consider relative power level between the PTRS and the data signaling it is associated to. The data signaling may in particular be PDSCH signaling. In some variants, instead of data signaling, control signaling may be associated to the PTRS and/or included in the signaling. Data signaling may in general comprise first data signaling and/or second data signaling, which may have the same or different number of layers, e.g. associated to different TRPs and/or transmission sources. Control signaling may comprise first control signaling and/or second control signaling, which may be associated to different TRPs and/or transmission sources, e.g. as PDCCH transmitted on multiple layers. For different (relative) power levels, the evaluation may operate differently. In general, PTRS and associated data signaling or control signaling may be transmitted at different power levels; however, the power level may also be the same. The relative power level may be corresponding.

It may be considered that the signaling may comprise first signaling and second signaling, which may be associated to different TRPs or transmission sources. In general, depending on the number of TPRs and/or transmission sources and/or PTRS ports, the relative power level of PTrs and associated data or control signaling (e.g., between first PTRS and first data or control signaling; and/or between second PTRS and second data or control signaling) may be different.

It may be considered that the relative power level corresponds to a transmission power level. This level may be well-defined, whereas a reception power level may be strongly dependent on pathloss, which may be different for different signals.

In some variants, the signaling may comprise first signaling and second signaling, wherein the first signaling comprises first Phase Tracking Reference Signaling, PT-RS, on a first set of subcarriers, and the second signaling comprises second PT-RS on a second set of subcarriers, wherein the first set of subcarriers is non-overlapping with the second set of subcarriers. This allows limiting interference for the PTRS.

It may be considered that first signaling of the signaling may be muted on a second set of subcarriers associated to second PTRS of second signaling of the signaling, and/or second signaling of the signaling may be muted on a first set of subcarriers associated to first PTRS of first signaling of the signaling. The muted signaling may be data signaling or control signaling, or reference signaling. Thus, the transmitter avoids introducing interference on the PTRS.

In general, the relative power level may be dependent on one or more Modulation and Coding Schemes associated to the signaling. In particular, different MCS may be associated to first signaling and second signaling. The MCS may pertain to transmission of data signaling in particular, and/or may be scheduled with multiple DCI, e.g. a first DCI scheduling the first signaling and a second DCI scheduling second signaling, or in some cases on DCI scheduling different MCS for different component (e.g., first and second) signalings of the signaling. Thus, large flexibility may be provided, e.g. for link adaptation.

It may be considered that the relative power level may be in conformance with and/or according to, a table. The table may index the relative power level based on one or more parameters, e.g. number of PTRS and/or layers and/or MCS and/or type of scheduling; different tables may be associated to different of such parameters. A table may pertain to a first signaling of the signaling, and/or to first and second signaling of the signaling.

In general, the relative power level may be indicated by, and/or based on, or on reference to Energy Per Resource Element, EPRE. It should be noted that in general, a relative power level may be associated to a transmission time of the signaling, e.g. covering one or more allocation units or symbols. The relative power level may be in units of dBm.

Alternatively, or additionally, the method of operating a receiving radio node in a wireless communication network may comprise receiving first signaling and second signaling, wherein the first signaling may comprise first Phase Tracking Reference Signaling, PT-RS, on a first set of subcarriers, and the second signaling may comprise second PT-RS on a second set of subcarriers. The first set of subcarriers may be non-overlapping with the second set of subcarriers.

Alternatively, or additionally, the receiving radio node for a wireless communication network may be adapted for receiving first signaling and second signaling. The first signaling comprises first Phase Tracking Reference Signaling, PT-RS, on a first set of subcarriers, and the second signaling comprises second PT-RS on a second set of subcarriers, wherein the first set of subcarriers may be non-overlapping with the second set of subcarriers.

Alternatively, or additionally, the method of operating a transmitting radio node in a wireless communication network may comprise transmitting first signaling and second signaling, wherein the first signaling may comprise first Phase Tracking Reference Signaling, PT-RS, on a first set of subcarriers, and the second signaling may comprise second PT-RS on a second set of subcarriers. The first set of subcarriers may be non-overlapping with the second set of subcarriers.

Alternatively, or additionally, the transmitting radio node for a wireless communication network may be adapted for transmitting first signaling and second signaling, wherein the first signaling may comprise first Phase Tracking Reference Signaling, PT-RS, on a first set of subcarriers, and the second signaling may comprise second PT-RS on a second set of subcarriers. The first set of subcarriers may be non-overlapping with the second set of subcarriers.

In general, a set of subcarriers may comprise a plurality of subcarriers, which may be distributed over a frequency range associated to, and/or allocated for data signaling to which the PTRS may be associated. The frequency ranges for the first signaling and second signaling may overlap and/or be identical.

It may be considered that the first signaling is muted on the second set of subcarriers, and/or the second signaling is muted on the first set of subcarriers. The muting may be indicated to the receiving radio node, e.g. with control signaling, and/or may be configured or configurable, or predefined. For example, it may be configured via a CSI-RS configuration indicating subcarriers to be ZP-CSI-RS elements (e.g., with RRC signaling), e.g. if the signaling is downlink signaling.

In some variants, the first set of subcarriers may be located in different Physical Resource Blocks than the second set of subcarriers. Each set may comprise subcarriers associated to and/or mapped to and/or located in different PRBs.

In general, the first set of subcarriers may be offset from the second set of subcarriers by one or more subcarriers. In particular, a subcarrier of the first set located in the same PRB as a subcarrier of the second set may be shifted or offset in frequency domain by the one or more subcarriers (which may be empty or carry signaling, e.g. data signaling).

It may be considered that the first set of subcarriers may be clustered, and/or the second set of subcarriers may be clustered. Multiple clusters may be distributed over the allocated frequency range (for the first signaling and/or second signaling). Clusters of subcarriers of the first set may be shifted or non-neighbouring in frequency domain from clusters of subcarriers of the second set.

It may be considered that the first set of subcarriers and the second set of subcarriers are interlaced or interleaved, e.g. clusters of subcarriers may be interlaced or interleaved.

The first PTRS may be represented by a signaling sequence or sequence of modulation symbols, which may be cyclic, e.g. within a cluster. The second PTRS may be represented by a signaling sequence or sequence of modulation symbols, which may be cyclic, e.g. within a cluster. The sequences of the first PTRS may be shifted relative to the sequence of the second PTRS, e.g. based on a code or cyclic shift.

The receiving radio node may comprise radio circuitry, in particular receiver circuitry or circuitries for receiving the first signaling and/or second signaling and/or processing circuitry for processing such. Radio circuitry and/or processing circuitry may be adapted for estimating the phase noise and/or filtering (e.g., de-ICI filtering) and/or demodulating and/or decoding the signaling. Receiving may comprise demodulating and/or decoding the first signaling and/or the second signaling, in particular data signaling and/or communication signaling and/or control signaling associated thereto and/or comprised therein, e.g. based on the estimated phase noise. Processing signaling may comprise demodulating, and/or decoding, and/or estimating phase noise, and/or performing an ICI correction, and/or filtering of or for signaling. The receiving radio node may be implemented as a wireless device or terminal or UE or feedback radio node; however, in some variants it may be implemented as network node or signaling radio node.

The transmitting radio node may comprise radio circuitry, in particular transmitter circuitry or circuitries for transmitting the first signaling and/or second signaling and/or processing circuitry for processing such. Radio circuitry and/or processing circuitry may be adapted for modulating and/or coding the first signaling and/or the second signaling, in particular data signaling and/or communication signaling and/or control signaling associated thereto and/or comprised therein, and/or mapping PTRS and/or data or control signaling associated thereto to frequency resources. Processing signaling may comprise modulating, and/or coding, and/or mapping the signaling and/or PTRS. The transmitting radio node may be implemented as a network node or base station or signaling radio node; however, in some variants it may be implemented as wireless device or terminal or UE or feedback radio node.

The first signaling and the second signaling may each comprise data signaling and/or control signaling and/or communication signaling. The first PTRS may be associated to the data signaling and/or control signaling and/or communication signaling of the first signaling. The second PTRS may be associated to the data signaling and/or control signaling and/or communication signaling of the second signaling. The payload of the first and second signaling may be the same in some variants, e.g. when scheduled with a single DCI, and/or may be associated to the same channel or channel type, e.g. data channel or control channel, e.g. PDSCH or PUSCH or PUCCH or PDCCH. There may be considered examples in which the payloads may be different. The payload may correspond to user data and/or control information bits. A first set of subcarriers may be considered non-overlapping with a second set of subcarriers if no subcarrier of the first set is also a member of the second set (and/or vice versa). The first set and the second set may be distributed in clusters, such that multiple subcarriers of the first set (e.g., N1) and multiple subcarriers of the second set (e.g., N2) may form a continuous and/or neighboring set of subcarriers, e.g. covering N1+N2 subcarriers. N1 and N2 may be equal, or different in some cases. There may be multiple sets forming multiple clusters in frequency domain. The first PT-RS and the second PT-RS may be transmitted and/or received simultaneously, e.g. withing a cyclic prefix length, and/or on the same symbol time interval or allocation unit. The phase noise may represent the phase noise of the first signaling, which may have a component due to the second signaling. The first signaling and second signaling may be scheduled (e.g., dynamically) with the same DCI (e.g., a single DCI), or with different Das (e.g., multiple DCIs).

In general, the first signaling may be transmitted by a different transmission source or TRP than the second signaling. For example, the first signaling may be transmitted by a first TRP and the second signaling may be transmitted by a second TRP. Alternatively, or additionally, the first signaling and/or first PTRS may be associated to a first antenna port or DMRS port or PTRS port, and the second signaling and/or second PTRS may be associated to a second, different, antenna port or DMRS port or PTRS port. Signaling associated to different ports may be orthogonalised, e.g. by cyclic shift and/or code and/or frequency domain distribution. Different TRPs or transmission sources may be associated to and/or controlled by the same transmitting radio node, e.g. the same base station or network node or wireless device.

It may be considered that the first signaling is muted on the second set of subcarriers (carrying PTRS of the second signaling), and/or the second signaling is muted on the first set of subcarriers (carrying PTRS of the first signaling). In particular, the first signaling may comprise zero power transmission on the second set and/or may not transmit a modulation symbol or signal on subcarriers of the second set, and/or vice versa for the second signaling. Thus, the PT-RS of one signaling are subject to limited interference.

Transmitting signaling may comprise transmitting first and second signaling (or more reference signalings). Different signalings may be transmitted on different TPs or separate antennas and/or antenna ports and/or have different polarization and/or be on the same beam or different beams (e.g., showing Quasi-CoLocation QCL in one or more parameters) and/or may be shifted relative to each other. Communication signaling and reference signaling may be associated to different ports and/or antenna elements and/or beams and/or transmission or beam or signaling characteristics. Receiving reference signaling like PTRS or DMRS may comprise measuring, and/or perform measurements on, the reference signaling and/or providing a measurement report based on the reference signaling (e.g., the measurements).

It may be considered that the first signaling and second signaling may be synchronised to each other. In particular, they may start and/or end at the same times, and/or have allocation units with coinciding borders in time domain. A transmission time interval may correspond to a number CT of allocation units in time domain; both first and second signaling may extend over the CT allocation units. Simultaneous transmission of the first and second signaling may be effected. The synchronisation may be provided by the transmission radio node, which may e.g. transmit the signalings accordingly. The first and second allocation units may be considered to represent the same time domain intervals; as they may be considered to be attached or associated to different transmissions or transmission structures, they may be considered separate. However, in some perspectives (e.g., considering synchronisation), the first allocation units may be considered the same as the second allocation units. In some variants, the first and/or second allocation units may represent and/or contain and/or correspond to only one allocation unit, e.g. for a short signaling transmission, or two or less, or four or less allocation units. Each of the first and/or second signaling may correspond to one transmission or occurrence, or to several, e.g. consecutive in time domain and/or frequency domain (e.g., mapped such that parts of two occurrences are mapped to the same allocation unit, but different subcarriers or PRBs).

In general, second PTRS or DMRS may overlap and/or coincide in time with first PTRS or DMRS. The first and second PTRS and/or DMRS associated to the first and/or second signaling and/or the first and second signaling may be transmitted on the same carrier and/or bandwidth part and/or with overlapping frequency domain extension, e.g.

according to scheduling. The first and second signaling may be scheduled with one DCI or scheduling assignment, or with multiple DCIs.

It may be considered that second reference signaling may be shifted relative to the first reference signaling by having a different mapping of modulation symbols to resources. Resources may in particular be time and/or frequency resources, in particular subcarriers (e.g., in the same time interval corresponding to an allocation unit) and/or resource elements and/or resource blocks or other resource structure/s. This facilitates simple processing, e.g. to achieve suitable pseudo-orthogonality.

In general, second reference signaling may have a different transmission source than first reference signaling.

In general, the wireless device and/or network node may operate in, and/or the communication and/or signaling may be in, TDD operation. It should be noted that the transmission of signaling from transmission sources may be synchronised and simultaneous; a shift in time may occur due to different propagation times, e.g. due to different beams and/or source locations.

Reference signaling like PTRS (Phase Tracking RS) or DMRS may be considered associated to a data block if it allows and/or is intended to allow demodulation and/or correction for phase noise or phase errors of the signaling associated to the data block, e.g. based on processing and/or filtering based on received reference signaling.

A wireless device and/or feedback radio node (a wireless device may be considered an example for a feedback radio node), may in general comprise, and/or be adapted to utilise, processing circuitry and/or radio circuitry, in particular a transmitter and/or transceiver and/o receiver, to process (e.g., trigger and/or schedule) and/or transmit and/or receive signaling like data signaling and/or control signaling and/or reference signaling, in particular first signaling and second signaling. A wireless device or feedback radio node may be implemented as terminal or UE; in some cases, it may however be implemented as network node, in particular a base station or relay node or IAB node, in particular to provide MT (Mobile Termination) functionality for such. In general, a wireless device of feedback radio node may comprise and/or be adapted for transmission diversity, and/or may be connected or connectable to, and/or comprise, antenna circuitry, and/or two or more independently operable or controllable antenna arrays or arrangements, and/or transmitter circuitries and/or antenna circuitries, and/or may be adapted to use (e.g., simultaneously) a plurality of antenna ports (e.g., for transmitting first signaling and second signaling), e.g. controlling transmission using the antenna array/s, and/or to utilise and/or operate and/or control two or more transmission sources, to which it may be connected or connectable, or which it may comprise. The transmitting radio node may comprise multiple components and/or transmitters and/or transmission sources and/or TRPs (and/or be connected or connectable thereto) and/or be adapted to control transmission from such. Any combination of units and/or devices able to control transmission on an air interface and/or in radio as described herein may be considered a transmitting radio node.

A signaling radio node and/or network node (a network node may be considered an example of a signaling radio node) may comprise, and/or be adapted to utilise, processing circuitry and/or radio circuitry, in particular a receiver and/or transmitter and/or transceiver, to transmit and/or to process and/or receive (e.g. receive and/or demodulate and/or decode and/or perform blind detection and/or schedule or trigger) data signaling and/or control signaling and/or reference signaling, in particular first signaling and second signaling. Receiving may comprise scanning a frequency range (e.g., a carrier) for reference signaling and/or control signaling, e.g. at specific (e.g., predefined and/or configured) locations in time/frequency domain, which may be dependent on the carrier and/or system bandwidth. Such location/s may correspond to one or more location or resource allocations configured or indicated or scheduled or allocated to a feedback radio node, e.g. scheduled dynamically, or configured, e.g. with DCI and/or RRC signaling, e.g. for transmission on resources allocated for data signaling. In some cases, a signaling radio node may be a network node or base station or TRP, or may be an IAB node or relay node, e.g. providing control level functionality for such, e.g. DU and/or CU functionality. In some cases, e.g. sidelink scenarios, a signaling radio node may be implemented as a wireless device or terminal or UE. A signaling radio node or network node may comprise one or more independently operable or controllable receiving circuitries and/or antenna circuitries and/or may be adapted to utilise and/or operate to receive from one or more transmission source simultaneously and/or separately (in time domain), and/or to operate using (e.g., receiving) two or more antenna ports simultaneously, and/or may be connected and/or connectable and/or comprise multiple independently operable or controllable antennas or antenna arrays or subarrays.

An allocation unit may be considered to be associated to reference signaling or a reference signaling sequence if it carries at least a component of the reference signaling (e.g., a component of reference signaling is transmitted on the allocation unit). An allocation unit may in particular represent a time interval, e.g. a block symbol or the duration of a SC-FDM symbol, or OFDM symbol or equivalent, and/or may be based on the numerology used for the synchronisation signaling, and/or may represent a predefined time interval. The duration (in time domain) of an allocation unit may be associated to a bandwidth in frequency domain, e.g. a subcarrier spacing or equivalent, e.g. a minimum usable bandwidth and/or a bandwidth of an allocation unit. It may be considered that signaling spanning an allocation unit corresponds to the allocation unit (time interval) carrying the signaling and/or signaling being transmitted (or received) in the allocation unit. Transmission of signaling and reception of signaling may be related in time by a path travel delay the signaling requires to travel from the transmitter to receiver (it may be assumed that the general arrangement in time is constant, with path delay/multi path effects having limited effect on the general arrangement of signaling in time domain). Allocation units associated to different signalings, e.g. different reference signalings, in particular on different ports or TPs. may be considered to be associated to each other and/or correspond to each other if they correspond to the same number of allocation unit within a reference signaling transmission time interval, and/or if they are synchronised to each other and/or are simultaneous, e.g. in two simultaneous transmissions. Similar reasoning may pertain to a transmission time interval; the same interval for two signalings may be the intervals having the same number and/or relative location in the frame or timing structure associated to each signaling.

A reference signaling sequence (or shorter, signaling sequence) may correspond to a sequence of modulation symbols (e.g., in time domain, after DFT-spreading for a SC-FDM system, or in frequency domain for an OFDM system). The signaling sequence may be predefined. The set of modulation symbols used for the signaling sequence may be different from the set of modulation symbols used for communication signaling; in particular, the reference signaling and/or signaling sequence may represent different constellations in modulation and/or phase space than the communication signaling.

There is also described a program product comprising instructions causing processing circuitry to control and/or perform a method as described herein.

Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
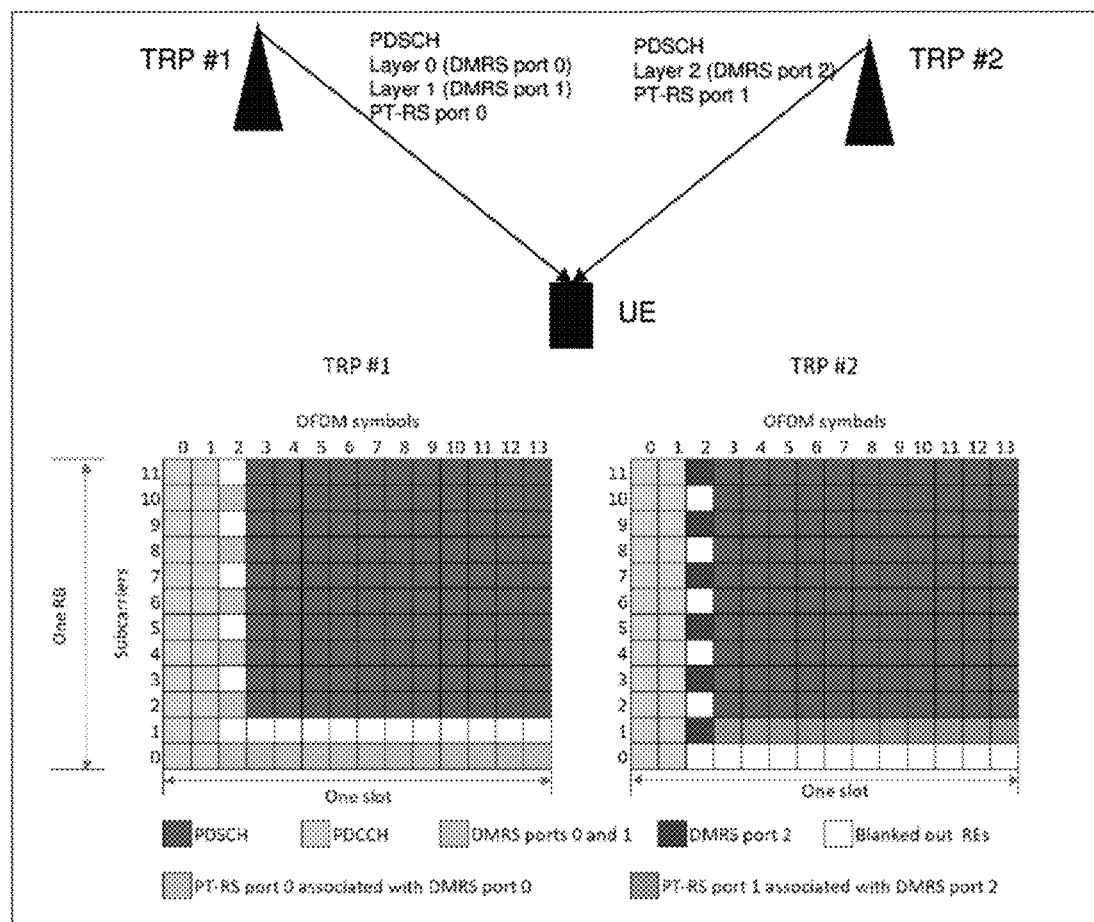
FIG. 1, showing an exemplary signaling scenario.

In the following, concepts are explained with reference to NR, in particular according to Rel. 16.4 or higher. However, the concepts and approaches may be applicable to other systems and technology, e.g. with functionality allowing transmission of PTRS or equivalent reference signaling with signaling on single or multiple transmission sources or TRPs.

In NR, phase tracking reference signal (PT-RS) can be configured for PDSCH transmissions in order for the receiver to correct phase noise related errors. PT-RS can be configured with the higher layer parameter phase Tracking RS in dmrs-DownlinkForPDSCH-MappingTypeA or dmrs-DownlinkForPDSCH-MappingTypeB for PDSCH scheduled by DCI format 1_0 or DCI format 1_1, or in dmrs-DownlinkForPDSCH-MappingTypeA-DCI-1-2 or dmrs-DownlinkForPDSCH-MappingTypeB-DCI1-2 for PDSCH scheduled with DCI format 1_2.

In the frequency domain, a PT-RS may be in at most one subcarrier per every 2 PRBs. Also, the subcarrier used for a PT-RS port may be one of the subcarriers also used for the DM-RS port associated with the PT-RS port (note that PT-RS may be not transmitted for DMRS carrying symbols). For DMRS configuration type 1, a DMRS port is mapped to every second subcarrier. Consequently, an associated PT-RS can only be mapped to one out of 6 subcarriers. An offset can be configured to determine which subcarrier the DM-RS is mapped to.

In the time domain, the time domain density of PT-RS may be a function of the scheduled MCS. The PT-RS time density may for example be one of 1,2 or 4, corresponding to PT-RS in every OFDM symbol, every second OFDM symbols, or every fourth OFDM symbol in a slot, respectively, which may be determined based on the scheduled MCS. For low MCS values (i.e., $I_{MCS}<$ptrs-MCS$_1$), PT-RS may be not transmitted as downlink symbol reception is not very sensitive to phase noise at low MCSs. The modulated symbol used for the PT-RS may be the same as the associated DMRS at the same subcarrier. If a UE is scheduled with one codeword, the PT-RS antenna port is associated with the lowest indexed DM-RS antenna port among the DM-RS antenna ports assigned for the PDSCH. If a UE is scheduled with two codewords (two independent transmissions), the PT-RS antenna port is associated with the lowest indexed DM-RS antenna port among the DM-RS antenna ports assigned for the codeword with the higher MCS. If the MCS indices of the two codewords are the same, the PT-RS antenna port is associated with the lowest indexed DM-RS antenna port assigned for codeword 0.

An important aspect is that PT-RS may never be present when using DM-RS ports 1004-1007 for DMRS Type 1 and ports 1006-1011 for DMRS Type 2. When PT-RS is present, the maximum rank is 6.

The PT-RS transmit power may be boosted when the PDSCH contains more than one spatial layer. In other words, the ratio of PT-RS energy per resource element (EPRE) to PDSCH EPRE per layer ($\rho_{PTRS}$) can be greater than 0dB. This is because for PT-RS, only a single layer is transmitted while PDSCH can have multiple layers. For the same total EPRE, per layer EPRE for PT-RS can be larger than for PDSCH when the PDSCH has more than one layer.

The PDSCH PT-RS symbols may be scaled by a factor $$\beta_{PTRS} = 10^{\frac{\rho_{PTRS}}{20}}.$$

In NR Rel-16, non-coherent joint transmission (NC-JT) of PDSCH from two TRPs was introduced, in which different layers of a PDSCH are transmitted from different TRP. This is indicated to a UE by signaling two Transmission Configuration Indicator (TCI) states and DMRS ports in two CDM groups in a DCI scheduling the PDSCH, where a first TCI state is associated with a first CDM group and a second TCI state is associated with a second CDM group. The first and the second TCI states are associated with a first and a second TRP, respectively.

A TCI state is used in NR to indicate a so called quasi co-location (QCL) relationship between two antenna ports. QCL describes the large-scale channel properties such Doppler shift/spread, average delay spread, or average delay. If antenna ports A and B are QCLed with respect to average delay, the UE can estimate the average delay from the signal received from antenna port A (known as the source reference signal (RS)) for antenna port B (target RS). The target RS is DMRS in TCI states for PDSCH.

An example is shown FIG. 1, where a PDSCH with 3 layers is transmitted from two TRPs with the first two layers transmitted from TRP #1 and the third layer from TRP #2. TRP#1 is associated with TCI state i and TRP #2 is associated with TCI state j. The first two layers are associated DMRS ports 0 and 1 in CDM group 0 and the third layer is associated with DMRS port 2 in CDM group 1.

When a PDSCH with multiple layers is scheduled from two TRPs, a subset of the layers is transmitted from each of the two TRPs. Since different frequency sources may be used in different TRPs, the generated phase noise can be different. Therefore, two PT-RS ports were introduced in NR Rel-16, and each PT-RS port is transmitted from one of the two TRPs. In this case, because different power amplifiers are used in the two TRPs, power cannot be shared between layers across the TRPs. Thus, the amount of PT-RS power allocation for a PT-RS port would depend on only the number of PDSCH layers scheduled from the same TRP.

For example, consider the example where a PDSCH with 3 layers are scheduled with 2 layers over TRP #1 and 1 layer over TRP #2. DMRS ports #0 and #1 are associated with the TRP #1 and DMRS port #2 with TRP #2. If two PT-RS ports are configured, PT-RS port #0 is associated with DMRS port #0 and PT-RS port #1 is associated with DMRS port #2.

Then, the power boosting ratio for PT-RS port #0 can be up to 3dB, while for PT-RS port #1, no power boosting can be done. Therefore, in general the amount of power boosting for the two PT-RS ports can be different.

When different layers of a PDSCH are transmitted from two different TRPs and two PT-RS ports are configured, one associated to each TRP, the existing PT-RS power allocation does not fully utilize the allocated transmit power from each TRP. A new downlink PT-RS power allocation may be considered for NC-JT based PDSCH transmission from two TRPs, in which PT-RS power can be further boosted without reducing the PDSCH transmit power. More transmit power can be used for PT-RS transmission without reducing the PDSCH transmit power and thus, better phase tracking performance can be achieved.

In case of NC-JT based PDSCH transmission from two TRPs, the REs for transmitting a PT-RS port from one TRP are not used in the other TRP for any purpose, i.e., the REs may be blanked out in the other TRP.

Reverting to FIG. 1, a PDSCH with 3 layers is scheduled from two TRPs. The first two layers are associated with DMRS ports 0 and 1 and are transmitted from TRP #1. The third layer is associated with DMRS port 2 and is transmitted from TRP #2. For phase tracking purpose, two PT-RS ports are configured. PT-RS port 0 is transmitted from TRP #1 and PT-RS port 1 is transmitted from TRP #2. Note that the two PT-RS ports are present in different subcarriers of the same RBs and have the same density in both time and frequency. Also, two PT-RS ports are present in the same OFDM symbols. Thus, for each TRP, the power allocated in the blanked out RE can be used to increase or boost the PT-RS transmit power by 3dB from that TRP while keeping the same average PDSCH transmit power as well as total transmit power (PDSCH and PT-RS) as that when the REs are used for PDSCH transmission.

The ratio of PT-RS EPRE to PDSCH EPRE per layer per RE ($\rho_{PTRS}$) for each of the two PT-RS ports can be increased accordingly when two PT-RS ports are configured. For example, a new row may be added in Table 4.1-2 of 3 gpp TS 38.214 v16.4.0 (or later), or the existing row with epre-ratio=0 may be modified.

Table 1 shows an example in which the first row (i.e., with epre-ratio=0) is modified such that the ratios depend on the number of PT-RS ports, Qp. When a single PT-RS port is configured, i.e., Qp=1, the ratios for epre-Ratio=0 is the same as ratios in existing Table 4.1-2 of 3 gpp TS 38.214 v16.4.0. When two PT-RS ports are configured and NC-JT based PDSCH transmission is indicated, i.e., Qp=2, the ratio is increased by 3 dB.

TABLE 1

The ratio of PT-RS EPRE to PDSCH EPRE per layer per RE ($\rho_{PTRS}$)

| epre-Ratio | The number of PDSCH layers with DM-RS associated to the PT-RS port | | | | | |
| --- | --- | --- | --- | --- | --- | --- |
| | 1 | 2 | 3 | 4 | 5 | 6 |
| 0 | 3Qp − 3 | 3Qp | 3Qp + 1.77 | 3Qp + 3 | 3Qp + 4 | 3Qp + 4.77 |
| 1 | 0 | 0 | 0 | 0 | 0 | 0 |
| 2 | | | | reserved | | |
| 3 | | | | reserved | | |

Table 2 shows another example in which a new row with epre-ratio=2 is added.

TABLE 2

The ratio of PT-RS EPRE to PDSCH EPRE per layer per RE ($\rho_{PTRS}$)

| epre-Ratio | The number of PDSCH layers with DM-RS associated to the PT-RS port | | | | | |
| --- | --- | --- | --- | --- | --- | --- |
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | 3Qp − 3 | 3Qp | 3Qp + 1.77 | 3Qp + 3 | 3Qp + 4 | 3Qp + 4.77 |
| 3 | | | | reserved | | |

When 2 PT-RS ports are configured, a PDSCH can still be scheduled from a single TRP by indicating a single TCI state in the corresponding DCI. In that case, one PT-RS port is transmitted together with the PDSCH. Therefore, Qp is the actual number of the PT-RS ports associated with a PDSCH, not the higher layer configured number of PT-RS ports. In 3GPP specifications, a rule may be specified where Qp=2 when all the following conditions are met:
  2 downlink PT-RS ports may be configured in the PTRS-DownlinkConfig information element (i.e., maxNrof-Ports-r16 in PTRS-DownlinkConfig is set to n2),
  2 TCI states may be indicated in the TCI field of the DCI that schedules the PDSCH, and
  DM-RS ports associated with the PDSCH belong to two CDM groups.

The above embodiment applies to the case when a single DCI is used to schedule a $1^{st}$ set of layers from TRP#1 and a $2^{nd}$ set of layers from TRP#2 where the union of both sets are within the same PDSCH (each set may comprise one or more layers, different sets may comprise different numbers of layers). In this case the REs used by TRP#2 for the $2^{nd}$ PTRS port are muted in the transmission from TRP#1 and vice versa. This ensures that there is no PDSCH to PTRS interference between layers, and thus phase noise can be effectively compensated.

A variation of the above embodiment may apply to the case when multi-DCI scheduling is used to schedule two separate PDSCHs, one from each TRP. This is indicated by configuring the UE with a plurality of CORESETs (Control resource sets) in which a first subset of the CORESETs is configured with a CORESET Pool ID that is different than for a second (mutually exclusive) subset of CORESETs. In this, case, if a set of aperiodic ZP-CSI-RS (zero power channel state information reference signal) resources is triggered by the scheduling DCI transmitted from TRP#1 (#2) such that the PDSCH transmitted from one TRP#1 (#2) is rate matched around the PTRS REs used by TRP#2, then the new row with epre-ratio=2 can be used for reception of the PTRS port associated with TRP#1 (#2). In other words, if each TRP mutes the REs associated with the PTRS port transmitted by the other TRP, then larger PTRS power boosting may be utilized by each TRP without reducing the PDSCH power from each TRP.

In another embodiment, different PDSCH layers corresponding to different codewords may be transmitted from the two TRPs. Hence, different MCSs corresponding to the two codewords are also signaled as part of the scheduling DCI that schedules the PDSCH. An example where PDSCH layers 0 and 1 are transmitted from TRP #1 and TRP #2, respectively, may be considered. In this example, PDSCH layer 0 corresponds to a first codeword while PDSCH layer 1 corresponds to a second codeword. The MCSs corresponding to the two codewords received from the two TRPs are denoted as MCS1 and MCS2. PT-RS port 0 corresponds to TRP #1 and PT-RS port 1 corresponds to TRP #2. Since the time density of the PT-RS is dependent on the scheduled MCS, in this embodiment the time domain densities of PT-RS port 0 and PT-RS port 1 can be different owing to the fact that MCS1 and MCS2 can be different due to different channel qualities between the UE and the two TRPs. The time domain densities of PT-RS ports 0 and 1 are two and one, respectively.

An example of PDSCH transmission from two TRPs in which a first layer is transmitted from TRP #1 and a second layer is transmitted from TRP #2, and two PT-RS ports are configured, one associated with each TRP may be considered. In this embodiment, the power boosting for a PT-RS RE may depend on the number of PT-RS ports in the OFDM symbol of that PT-RS RE. In the example, OFDM symbols 4, 6, 8, 10 and 12 may have two PT-RS ports transmitted, while OFDM symbols 3, 5, 7, 9, 11, and 13 have only one PT-RS port. In OFDM symbols 4, 6, 8, 10 and 12, for each TRP, the power blanked out REs can be used to increase or boost the PT-RS transmit power by 3 dB from that TRP while keeping the same average PDSCH transmit power as well as total transmit power (PDSCH and PT-RS) as that when the REs are used for PDSCH transmission. This power boost is applicable to both PT-RS port 0 and 1 in OFDM symbols 4, 6, 8, 10, and 12. However, in OFDM symbols 3, 5, 7, 9, 11, and 13, there is only a single PT-RS port, hence no such increase or boost of PT-RS transmit power is done for PT-RS port 1.

Table 3 shows an example in which the first row (i.e., with epre-ratio=0) is modified such that the ratios depend on the number of PT-RS ports in an OFDM symbol t, which is denoted by $Q_{p,t}$. When a single PT-RS port is transmitted in OFDM symbol t, then $Q_{p,t}=1$. When two PT-RS ports are transmitted in OFDM symbol t, then $Q_{p,t}=2$.

TABLE 3

The ratio of PT-RS EPRE to PDSCH EPRE per layer per RE ($\rho_{PTRS}$)

| epre-Ratio | The number of PDSCH layers with DM-RS associated to the PT-RS port | | | | | |
|---|---|---|---|---|---|---|
| | 1 | 2 | 3 | 4 | 5 | 6 |
| 0 | $3Q_{p,t}-3$ | $3Q_{p,t}$ | $3Q_{p,t}+1.77$ | $3Q_{p,t}+3$ | $3Q_{p,t}+4$ | $3Q_{p,t}+4.77$ |
| 1 | 0 | 0 | 0 | 0 | 0 | 0 |
| 2 | | | reserved | | | |
| 3 | | | reserved | | | |

Table 4 shows another example in which a new row with epre-ratio=2 is added such that the ratios depend on the number of PT-RS ports in an OFDM symbol t, which is denoted by $O_{p,t}$.

TABLE 4

The ratio of PT-RS EPRE to PDSCH EPRE per layer per RE ($\rho_{PTRS}$)

| epre-Ratio | The number of PDSCH layers with DM-RS associated to the PT-RS port | | | | | |
|---|---|---|---|---|---|---|
| | 1 | 2 | 3 | 4 | 5 | 6 |
| 0 | 0 | 0 | 3 | 4.77 | 6 | 7 | 7.78 |
| 1 | 0 | 0 | 0 | 0 | 0 | 0 |
| 2 | $3Q_{p,t}-3$ | $3Q_{p,t}$ | $3Q_{p,t}+1.77$ | $3Q_{p,t}+3$ | $3Q_{p,t}+4$ | $3Q_{p,t}+4.77$ |
| 3 | | | reserved | | | |

Single DCI based NC-JT may be considered. If a UE is configured by the network with two PT-RS ports for PDSCH transmissions (i.e., the higher layer parameter "maxNrof-Ports-r16" is set to "n2" in "PTRS-DownlinkConfig" in TS38.331 v16.3.0), and 1) if a PDSCH is scheduled to the UE with a DCI indicating two TCI states, DMRS ports in two CDM groups, and a single MCS, 3 dB more power can be allocated to each of the two PT-RS ports associated with the PDSCH.

The ratio, $\rho_{PTRS}^{p}$, of PT-RS EPRE to PDSCH EPRE per layer for a PT-RS port p (p=0,1) associated with a PDSCH can be determined as $\rho_{PTRS}^{p}=R_p Q_p$ or $\rho_{PTRS}^{p}(dB)=10 \log 10(R_p)+10 \log 10(Q_p)$ where $Q_p$ is the actual number of PT-RS ports transmitted with the PDSCH, and $R_p$ is the number of MIMO layers associated with PT-RS port p in the PDSCH 2) if a PDSCH is scheduled to the UE with a DCI indicating two TCI states, DMRS ports in two CDM groups, and two MCS each associated to one of the two TCI states, the amount of additional PT-RS power boosting is OFDM symbol dependent The ratio, $\rho_{PTRS}^{p,t}$, of PT-RS EPRE to PDSCH EPRE per layer for a PT-RS port p at OFDM symbol t associated with a PDSCH can be determined as $\rho_{PTRS}^{p,t}=R_p Q_{p,t}$ or $\rho_{PTRS}^{p,t}(dB)=10 \log 10(R_p)+10 \log 10(Q_{p,t})$ where $Q_{p,t}$ is the actual number of PT-RS ports transmitted with the PDSCH in OFDM symbol t, and $R_p$ is the number of MIMO layers associated with PT-RS port p in the PDSC Multi-DCI based NC-JT may be considered. If a UE is configured by the network with one PT-RS port for PDSCH (i.e., the higher layer parameter "maxNrofPorts-r16"is set to "n1" in "PTRS-DownlinkConfig" in TS38.331 v16.3.0) and with multiple CORESETs having different CORESET pool indices in a bandwidth part (BWP), if a first PDSCH with a first PTRS port is scheduled to the UE with a first DCI, and a second PDSCH with a second PTRS port is scheduled to the UE with a second DCI in a same slot. A first and second sets of aperiodic ZP CSI-RS resources can be used to indicate the resources of the second and first PTRS ports in the first and second DCIs, respectively. The power for each of the PTRS ports can be boosted by 3 dB. The ratio, $\rho_{PTRS}^{p}$, of PT-RS EPRE to PDSCH EPRE per layer for a PT-RS port p can be determined as $\rho_{PTRS}^{p}=2R_p$ or $\rho_{PTRS}^{p}(dB)=3 dB+10 \log 10(R_p)$, where $R_p$ is the number of MIMO layers associated with PT-RS port p.

In general, it may be considered that for multi-TRP transmission, resources like resource elements used for PT-RS by one TRP may be muted or not used for transmission by the other TRP or TRPs.

An alternative clustered structure for a phase tracking reference signal (PT-RS) may be considered. PTRS may be clustered in the frequency domain to create a block of contiguous known symbols. To deal with dispersive channels and capture frequency diversity gains, for example, a multi-cluster block PTRS structure may for example have N PTRS clusters and each cluster consists of M PTRSs. A cyclic PTRS sequence may be used in each of the block PTRS cluster. That is, the ending portion of the PTRS sequence may identical to the starting portion of said sequence, and/or the PTRS may be considered to be cyclically extended in each cluster or continuous block. The advantage of the cyclic PTRS sequence is the possibility to use a lower complexity ICI filter estimation algorithm though at some cost of performance degradation. When using a distributed PTRS structure for CP-OFDM, in single-DCI based multi-TRP transmission with one PTRS port configured for each TRP, the PTRS subcarriers corresponding to two different TRPs may be located next to each other. Meanwhile, to avoid PDSCH to PTRS interference caused by multi-TRP transmission, the PTRS subcarriers associated with the second TRP may be muted in the transmission from the first TRP and vice versa. As such, a direct de-ICI algorithm utilizing the PDSCH subcarriers immediately adjacent to the PTRS subcarriers for de-ICI filter estimation, cannot be re-used directly to the multi-TRP transmission scenario.

In an exemplary PTRS frequency distribution, specifically an exemplary PTRS structure for two TRPs with a density setting K=2 for the subcarriers used for PTRS for each TRP, such that every second PRB carries PTRS. It can be observed that subcarriers used for PTRS from the two TRPs are adjacent to each other. For the signal transmitted from TRP1 (TRP2), the subcarriers used for PTRS for TRP2 (TRP1) are muted, e.g., zero power transmission is used on these sub-carriers.

A frequency merged block PTRS structure for multi-TRP transmissions with cyclic PTRS sequences (an example for a clustered distribution) may be considered, for which PTRS from the two TRPs may be adjacent to each other. For the signal transmitted from TRP1 (TRP2), the subcarriers used for PTRS for TRP2 (TRP1) are muted, e.g., zero power transmission is used on these sub-carriers. From the receiver perspective, PTRS from different TRPs are on contiguous and/or neighboring subcarriers in a block or cluster, covering N>2 subcarriers or M>1 PRBs.

In general, it may be considered that for multi-TRP transmission, resources like resource elements used for PT-RS by one TRP are muted or not used for transmission by the other TRP or TRPs. An alternative clustered structure for a phase tracking reference signal (PT-RS) may be considered, in particular for multi-TRP cases.

Scenarios with transmissions from multiple transmission sources and/or multiple TRPs and/or multiple PTRS ports may be considered. Different TRPs may be numbered, e.g. as TRP1, TRP2, . . . . The examples may refer to two TRPs, but more than two TRPs may be utilised analogously. Reference may be made to TRP only for brevity; however, such references may be interpreted to refer to a transmission source or PTRS port or associated DMRS port instead. In general, there may be transmission of signaling (and/or reception) comprising the PTRS as described herein. In general, each subcarrier may carry PTRS at most from one TRP or transmission source. A subcarrier carrying PTRS of one TRP may be considered to be associated to that TRP (and vice versa). It may be considered that a subcarrier carrying PTRS refers to a modulation symbol of the PTRS being transmitted or carried on the subcarrier, e.g. based on a signaling sequence for the PTRS. Each PRB may in general comprise 12 subcarriers, or, for other systems than NR, a different number.

In general, a distributed PTRS arrangement or distribution may refer to scenarios in which a PRB has at most one subcarrier carrying PTRS from one (the same) TRP, or in some cases, at most two subcarriers (which may be neighbouring in frequency domain, or in some cases, not), and/or no neighbouring subcarriers (in frequency domain) carrying PTRS from the same PTRS. A PRB may have (different) subcarriers carrying PTRS from more than one TRP, unless specifically stated otherwise.

A cluster or block arrangement or distribution of PTRS may refer in general to a distribution in which a PRB has more than one or more than two subcarriers carrying PTRS from one TRP, in particular 4 or more. The subcarriers may be neighbouring in frequency domain, or be apart. To be apart, they may for example be interleaved or interlaced such that between two subcarriers associated to one TRP, there is arranged one or more subcarrier associated to another TRP and/or one or more empty subcarriers and/or subcarriers carrying data or control information may be arranged between two subcarriers associated to one TRP. This may refer to the same OFDM or SCFDM symbol or the same allocation unit, and/or pertain to simultaneous transmission of the PTRS.

In general, it may be considered that a network node configures a wireless device for receiving first and second signaling, e.g. as indicated herein. The configuring may be performing using RRC signaling, and/or MAC layer signaling, and/or in some cases DCI signaling may be used, e.g. to indicate a configuration provided with higher layer signaling like RRC signaling or RLC signaling.

Figure 2:
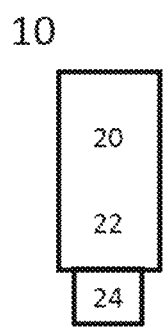
FIG. 2, showing an exemplary (e.g., feedback) radio node.

FIG. 2 schematically shows a radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication (which may be within coverage of the cellular network, or out of coverage; and/or may be considered non-cellular communication and/or be associated to a non-cellular wireless communication network). Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 3:
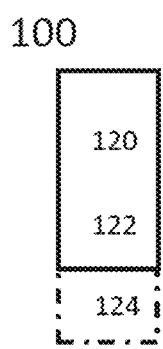
FIG. 3, showing another exemplary (e.g., signaling) radio node.

FIG. 3 schematically shows a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein;

in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Aspects regarding QCL may be considered. For example, several signals may be transmitted from different antenna ports and/or transmission sources associated to the same base station at a same or different time. If these signals have the same large-scale properties such as Doppler shift/spread, average delay spread, or average delay, these antenna ports are said to be quasi co-located (QCL) with respect to the large-scale properties. If a UE knows that two antenna ports are QCL with respect to a certain parameter (e.g. Doppler spread), the UE can estimate that parameter based on a first antenna port and apply that estimate for receiving signal on the second antenna port. Typically, a measurement reference signal (RS) such as NZP CSI-RS (Non-Zero Power Channel State Information Reference Signal) or SSB (Synchronization Signal Block), known as source RS, is sent on the first antenna and another signal such as a demodulation reference signal (DMRS), known as target RS, is sent on the second antenna port. For instance, if antenna ports A and B are QCL with respect to average delay, the UE can estimate the average delay from the signal received from antenna port A and assume that the signal received from antenna port B has the same average delay. This is useful for demodulation because in some scenarios, certain channel properties cannot be reliably estimated based on signals (e.g., DMRS) received on port B. With the QCL relation, the UE can first measure certain channel properties on antenna port A and apply an appropriate channel estimation filter when receiving signals on antenna port B. Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D is known as spatial QCL. There is currently no strict definition of spatial QCL, but the understanding is that if two transmitted antenna ports are spatially QCL, the UE can use the same Rx beam to receive them.

TCI states may be considered. A QCL relation between two RS may be signaled or indicated to a UE or wireless device through so called TCI (Transmission Configuration Indicator) states. Each TCI state can contain one or two source RS and associated QCL type. For example, a TCI state may contain a pair of source RS and QCL types, e.g., {NZP CSI-RS1, QCL Type A} and {NZP CSI-RS2, QCL Type D}. In this example, the UE can derive Doppler shift, Doppler spread, average delay, delay spread from NZP CSI-RS1 and Spatial Rx parameter (i.e. the RX beam to use) from NZP CSI-RS2. A TCI state can be interpreted as a possible beam transmitted from the network and/or a possible TRP (Transmission Point) used by the network to communicate with the UE. A UE may be configurable through RRC signaling, e.g. with up to 8 TCI states in FR1 and 128 TCI states in FR2 for PDSCH, depending on UE capability. Up to 8 TCI states per BWP (Bandwidth Part) per serving cell may be activated by MAC (Medium Access Control) CE (Control Element). The UE determines QCL for a PDSCH reception based on the TCI-State(s) indicated in the 'Transmission Configuration Indication' field in a DCI scheduling the PDSCH. A mapping between a TCI codepoint in DCI and one or two TCI states may be provided in the enhanced PDSCH MAC CE that activates the TCI states.

In some variants, a search space set may be defined over a CORESET. A CORESET may consist of $N_{RB}^{CORESET}$ resource blocks in the frequency domain and $N_{symb}^{CORESET} \in \{1,2,3\}$ consecutive OFDM symbols in the time domain. For each DL BWP configured to a UE in a serving cell, a UE may be provided by higher layer signalling with P≤5 CORESETs. For each CORESET, a UE may be configured by RRC (Radio Resource Control) signaling with CORESET information element (IE), which may include one or more of:

ControlResourceSetId: a CORESET index $^p$, 0≤p≤16;
a DM-RS scrambling sequence initialization value;
a list of up to 64 TCI-States can be configured in a CORESET p;
an indication for a presence or absence of a transmission configuration indication (TCI) field for DCI format 1_1 transmitted by a PDCCH in CORESET $^p$. The corresponding field for indicating a presence or absence of a TCI field for DCI format 1_2 is given by 'tci-PresentInDCI-ForDCIFormat1_2'.

In general, for each CORESET or control region, one TCI state may be activated and/or associated, e.g. by a MAC CE transmitted by a network node.

Single-DCI based DL data transmission over Multiple Transmission Points (TRP) may be considered. A PDSCH, which in general may correspond to data signaling, and/or a data block (in particular, a transport block or code block bundle) may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI. The network may configure the UE with multiple TCI states via RRC. Whether a codepoint in the TCI field is mapped to one or two TCI states may be provided by an enhanced PDSCH MAC CE that activates the TCI states.

As one example of PDSCH transmission over two TRPs, a case may be considered in which different layers of a PDSCH are sent over two TRPs, each associated with a different TCI state. In this case, two DMRS ports, one for each layer, in two CDM (Code Division Multiplex, shifted by different codes) groups may also be signaled to the UE. A first TCI state is associated with the DMRS port in a first CDM group, and a second TCI state is associated with the DMRS port in a second CDM group. This approach may be referred to as NC-JT (Non-coherent joint transmission) or scheme In this context, a single CW (codeword, e.g. associated to one data block) may be transmitted over two TRPs.

Transmitting PDSCH over multiple TRPs can also be used to improve PDSCH transmission reliability. For example, a PDSCH may be sent over TRP1 in PRGs (precoding RB group) {0,2,4} and over TRP2 in PRGs {1,3,5}. The PDSCH is scheduled by a PDCCH or DCI which may be sent over TRP1, i.e. associated with TCI state 1. In another variant, PDSCH Occasion #1 may be transmitted in PRGs {0,2,4} from TRP1 and PDSCH Occasion #2 with the same TB may be transmitted in PRGs {1,3,5} from TRP2. The two PDSCH Occasions may carry the same encoded data payload, and may have the same, or different redundancy version; the UE or wireless device may perform soft combining of the two PDSCHs to achieve more reliable reception.

In some cases, data transmission with PDSCH repetition may be utilised, e.g. such that repetition of one PDSCH (e.g., codeword and/or data block) may occurs within a slot, with different transmission sources or TRP (e.g., with different QCL or TCI) transmitting different occasions of the repetitions. For example, each transmission may be in a mini slot of 4 OFDM symbols within a slot; transmission in different mini-slots may be provided by different transmission sources or TRPs. Each PDSCH transmission may be associated with a same or different RV. For these schemes, a single DCI transmitted from one TRP may be used to schedule multiple PDSCH transmissions over two TRPs.

Alternatively, Multi-DCI based PDSCH transmission with multiple TRPs may be considered. Multi-DCI scheduling for multi-TRP may refer to cases in which a UE or WD may receive two or more DCIs, each DCI scheduling a PDSCH. Each PDCCH and the corresponding (scheduled) PDSCH may be transmitted from the same TRP. For example, a PDSCH1 may be scheduled by PDCCH 1 from TRP1, and PDSCH2 may be scheduled by PDCCH 2 from TRP2. The two PDSCHs may be fully, partially, or non-overlapping in time and/or frequency. When the two PDSCHs are fully or partially overlapping, a same DMRS resource configuration may be assumed with DMRS ports of the two PDSCHs in different CDM groups and/or shifted relative to each other according to another approach. For multi-DCI operation, a UE may be configured with two CORESET pools, each associated with a TRP. Each CORESET pool may correspond to a collection of CORESETs that belongs to the same pool. A CORESET pool index can be configured in each CORESET, e.g. with a value of 0 or 1. For the two Das in the above example, they may be transmitted in two CORESETs belonging to different CORESET pools (i.e. with CORESETPoolIndex 0 and 1 respectively). The two PDSCHs may be associated to, and/or belong to, two different HARQ processes. For multi-DCI based PDSCH scheduling, TCI state activation and mapping to codepoints of the TCI field in DCI may be per CORESET pool; only a single TCI state may be mapped to a codepoint of TCI field in DCI. This means that a DCI sent in a CORESET pool can only schedule a PDSCH from one TRP.

In general, a block symbol and/or an allocation unit may represent and/or correspond to an extension in time domain, e.g. a time interval. A block symbol duration (the length of the time interval) may correspond to the duration of an OFDM symbol or a corresponding duration, and/or may be based and/or defined by a subcarrier spacing used (e.g., based on the numerology) or equivalent, and/or may correspond to the duration of a modulation symbol (e.g., for OFDM or similar frequency domain multiplexed types of signaling). It may be considered that a block symbol comprises a plurality of modulation symbols, e.g. based on a subcarrier spacing and/or numerology or equivalent, in particular for time domain multiplexed types (on the symbol level for a single transmitter) of signaling like single-carrier based signaling, e.g. SC-FDE or SC-FDMA (in particular, FDF-SC-FDMA or pulse-shaped SC-FDMA). The number of symbols may be based on and/or defined by the number of subcarrier to be DFTS-spread (for SC-FDMA) and/or be based on a number of FFT samples, e.g. for spreading and/or mapping, and/or equivalent, and/or may be predefined and/or configured or configurable. A block symbol in this context may comprise and/or contain a plurality of individual modulation symbols, which may be for example 1000 or more, or 3000 or more, or 3300 or more. The number of modulation symbols in a block symbol may be based and/or be dependent on a bandwidth scheduled for transmission of signaling in the block symbol. A block symbol and/or a number of block symbols (an integer smaller than 20, e.g. equal to or smaller than 14 or 7 or 4 or 2 or a flexible number) may be a unit (e.g., allocation unit) used or usable or intended e.g. for scheduling and/or allocation of resources, in particular in time domain. To a block symbol (e.g., scheduled or allocated) and/or block symbol group and/or allocation unit, there may be associated a frequency range and/or frequency domain allocation and/or bandwidth allocated for transmission.

An allocation unit, and/or a block symbol, may be associated to a specific (e.g., physical) channel and/or specific type of signaling, for example reference signaling. In some cases, there may be a block symbol associated to a channel that also is associated to a form of reference signaling and/or pilot signaling and/or tracking signaling associated to the channel, for example for timing purposes and/or decoding purposes (such signaling may comprise a low number of modulation symbols and/or resource elements of a block symbol, e.g. less than 10% or less than 5% or less than 1% of the modulation symbols and/or resource elements in a block symbol). To a block symbol, there may be associated resource elements; a resource element may be represented in time/frequency domain, e.g. by the smallest frequency unit carrying or mapped to (e.g., a subcarrier) in frequency domain and the duration of a modulation symbol in time domain. A block symbol may comprise, and/or to a block symbol may be associated, a structure allowing and/or comprising a number of modulation symbols, and/or association to one or more channels (and/or the structure may dependent on the channel the block symbol is associated to and/or is allocated or used for), and/or reference signaling (e.g., as discussed above), and/or one or more guard periods and/or transient periods, and/or one or more affixes (e.g., a prefix and/or suffix and/or one or more infixes (entered inside the block symbol)), in particular a cyclic prefix and/or suffix and/or infix. A cyclic affix may represent a repetition of signaling and/or modulation symbol/s used in the block symbol, with possible slight amendments to the signaling structure of the affix to provide a smooth and/or continuous and/or differentiable connection between affix signaling and signaling of modulation symbols associated to the content of the block symbol (e.g., channel and/or reference signaling structure). In some cases, in particular some OFDM-based waveforms, an affix may be included into a modulation symbol. In other cases, e.g. some single carrier-based waveforms, an affix may be represented by a sequence of modulation symbols within the block symbol. It may be considered that in some cases a block symbol is defined and/or used in the context of the associated structure.

In some variants, a reference beam and/or reference beams and/or reference signaling may correspond to and/or carry random access signaling, e.g. a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g. based on broadcast information provided by the radio node (the radio node performing the beam selection), e.g. with synchronisation signaling (e.g., SSB block and/or associated thereto). The reference signaling may correspond to synchronisation signaling, e.g. transmitted by the radio node in a plurality of beams. The characteristics may be reported on by a node receiving the synchronisation signaling, e.g. in a random access process, e.g. a msg3 for contention resolution, which may be transmitted on a physical uplink shared channel based on a resource allocation provided by the radio node.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking reference signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like an allocation unit and/or block symbol and/or block symbol group and/or transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/ decoding and 7 or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2* pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

In some cases, to one or more beams or signals or signalings may be associated a Quasi-CoLocation (QCL) characteristic or set of characteristics, or QCL class (also referred to as QCL type) or QCL identity; beams or signal or signalings sharing such may be considered to be Quasi-Colocated. Quasi-Colocated beams or signals or signalings may be considered (e.g., by a receiver) as the same beam or originating from the same transmitter or transmission source, at least in regard to the QCL characteristic or set or class or identity, and/or to share the characteristic/s. QCL characteristics may pertain to propagation of signaling, and/or one or more delay characteristics, and/or pathloss, and/or signal quality, and/or signal strength, and/or beam direction, and/or beam shape (in particular, angle or area, e.g. area of coverage), and/or Doppler shift, and/or Doppler spread, and/or delay spread, and/or time synchronisation, and/or frequency synchronisation, and/or one or more other parameters, e.g. pertaining to a propagation channel and/or spatial RX parameter/s (which may refer to reception beam and/or transmission beam, e.g. shape or coverage or direction). A QCL characteristic may pertain to a specific channel (e.g., physical layer channel like a control channel or data channel) and/or reference signaling type and/or antenna port. Different QCL classes or types may pertain to different QCL characteristics or sets of characteristics; a QCL class may define and/or pertain to one or more criteria and/or thresholds and/or ranges for one or more QCL characteristics beams have to fulfill to be considered Quasi-Colocated according to this class; a QCL identity may refer to and/or represent all beams being quasi-colocated, according to a QCL class. Different classes may pertain to one or more of the same characteristics (e.g., different classes may have different criteria and/or thresholds and/or ranges for one or more characteristics) and/or to different characteristics. A QCL indication may be seen as a form of beam indication, e.g. pertaining to all beams belonging to one QCL class and/or QCL identity and/or quasi-colocated beams. A QCL identity may be indicated by a QCL indication. In some cases, a beam, and/or a beam indication, may be considered to refer and/or represent a to a QCL identity, and/or to represent quasi-colocated beams or signals or signalings. To a QCL identity, there may be associated one or more ports, e.g. for one or more reference signaling types, e.g. DM-RS and/or CSI-RS and/or PT-RS. A QCI class or identity may be indicated by, and/or represented by, and/or be associated to a Transmission Configuration Indicator (TCI), which may be indicated with control signaling, e.g. in a DCI.

Transmission on multiple layers (multi-layer transmission) may refer to transmission of communication signaling and/or reference signaling simultaneously in one or more beams and/or using a plurality of transmission sources, e.g. controlled by one network node or one wireless device. The layers may refer to layers of transmission; a layer may be considered to represent one data or signaling stream. Different layers may carry different data and/or data streams, e.g., to increase data throughput. In some cases, the same data or data stream may be transported on different layers, e.g. to increase reliability. Multi-layer transmission may provide diversity, e.g. transmission diversity and/or spatial diversity. It may be considered that multi-layer transmission comprises 2, or more than 2 layers; the number of layers of transmission may be represented by a rank or rank indication.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength (e.g., as RSRP), and/or relative signal strength, e.g. in comparison to a reference signal (strength), or Energy per resource element or a transmitter power.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories and/or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or any combination or all of modules disclosed herein may be implemented in software and/or firmware and/or hardware. Different modules may be associated to different components of a radio node, e.g. different circuitries, or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3 GPP and/or 5 G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5 G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Scheduling may comprise indicating, e.g. with control signaling like DCI or SCI signaling and/or signaling on a control channel like PDCCH or PSCCH, one or more scheduling opportunities of a configuration intended to carry data signaling or subject signaling. The configuration may be represented or representable by, and/or correspond to, a table. A scheduling assignment may for example point to an opportunity of the reception allocation configuration, e.g. indexing a table of scheduling opportunities. In some cases, a reception allocation configuration may comprise 15 or 16 scheduling opportunities. The configuration may in particular represent allocation in time. It may be considered that the reception allocation configuration pertains to data signaling, in particular on a physical data channel like PDSCH or PSSCH. In general, the reception allocation configuration may pertain to downlink signaling, or in some scenarios to sidelink signaling. Control signaling scheduling subject transmission like data signaling may point and/or index and/or refer to and/or indicate a scheduling opportunity of the reception allocation configuration. It may be considered that the reception allocation configuration is configured or configurable with higher-layer signaling, e.g. RRC or MAC layer signaling. The reception allocation configuration may be applied and/or applicable and/or valid for a plurality of transmission timing intervals, e.g. such that for each interval, one or more opportunities may be indicated or allocated for data signaling. These approaches allow efficient and flexible scheduling, which may be semi-static, but may updated or reconfigured on useful timescales in response to changes of operation conditions.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising, or representing acknowledgement signaling and/or resource requesting information, may comprise encoding and/or modulating. Encoding and/or modulating may comprise error detection coding and/or forward error correction encoding and/or scrambling. Receiving signaling like control signaling or data signaling may comprise corresponding decoding and/or demodulation, e.g. based on reference signaling associated to the signaling to be received. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol (or allocation unit) may generally represent a starting symbol (allocation unit) or an ending symbol (allocation unit) for transmitting and/or receiving. A starting symbol (or allocation unit) may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol (or allocation unit) is associated to control signaling (e.g., on a control channel), the control signaling may be in response to received signaling (in sidelink or downlink), e.g. representing acknowledgement signaling associated thereto, which may be HARQ or ARQ signaling. An ending symbol (or allocation unit) may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol (or allocation unit) may be determined based on, and/or in relation to, such an ending symbol (or allocation unit).

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may in general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource structure may in time domain comprise and/or represent a time interval, e.g. one of more allocation units and/or symbols and/or slots and/or subframes. In general, any reference to a symbol as a time interval may be considered as a reference to an allocation unit as a more general term, unless the reference to the symbol is specific, e.g. referring to a specific division or modulation technique, or to modulation symbols as transmission structures.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space.

The duration of a symbol (symbol time length or interval or allocation unit) of the transmission timing structure may generally be dependent on a numerology and/or carrier, wherein the numerology and/or carrier may be configurable. The numerology may be the numerology to be used for the scheduled transmission.

A transmission timing structure may comprise a plurality of allocation units or symbols, and/or define an interval comprising several symbols or allocation units (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols and/or allocation units defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot. In some cases, a timing structure may be represented by a frame structure. Timing structures may be associated to specific transmitters and/or cells and/or beams and/or signalings.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

A signaling sequence may correspond to a sequence of modulation symbols (e.g., in time domain, or in frequency domain for an OFDM system). The signaling sequence may be predefined, or configured or configurable, e.g. to a wireless device. For OFDM or SC-FDM, each element of a signaling sequence may be mapped to a subcarrier; in general, for SC-based signaling, a corresponding mapping in time domain may be utilised (for example, such that each element may use essentially the full synchronisation bandwidth). A signaling sequence may comprise (ordered) modulation symbols, each modulation symbol representing a value of the sequence it is based on, e.g. based on the modulation scheme used and/or in a phase or constellation diagram; for some sequences like Zadoff-Chu sequences, there may be a mapping between non-integer sequence elements and transmitted waveform, which may not be represented in the context of a modulation scheme like BPSK or QPSK or higher. A signaling sequence may be a physical layer signaling or signal, which may be devoid of higher layer information. A signaling sequence may be based on a sequence, e.g. a bit sequence or symbol sequence and/or a modulation, e.g. performed on the sequence. Elements of a signaling sequence may be mapped to frequency domain (e.g., to subcarriers, in particular in a pattern like a comb structure or in interlaces) and/or in time domain, e.g. to one or more allocation units or symbol time intervals. A DFT-s-OFDM based waveform may be a waveform constructed by performing a DFT-spreading operation on modulation symbols mapped to a frequency interval (e.g., subcarriers), e.g. to provide a time-variable signal. A DFT-s-OFDM based waveform may also be referred to a SC-FDM waveform. It may be considered to provide good PAPR characteristics, allowing optimised operation of power amplifiers, in particular for high frequencies. In general, the approaches described herein may also be applicable to Single-Carrier based waveforms, e.g. FDE-based waveforms. Communication, e.g. on data channel/s and/or control channel/s, may be based on, and/o utilise, a DFT-s-OFDM based waveform, or a Single-Carrier based waveform.

A sequence may generally be considered to be based on a root sequence if it can be constructed from the root sequence (or represents it directly), e.g. by shifting in phase and/or frequency and/or time domain, and/or performing a cyclic shift and/or a cyclic extension, and/or copying/repeating and/or processing or operating on with a code, and/or interleaving or re-ordering of elements of the sequence, and/or extending or shortening the root sequence. A cyclic extension of a sequence may comprise taking a part of the sequence (in particular a border part like a tail or beginning) and appending it to the sequence, e.g. at the beginning or end, for example in time domain or frequency domain. Thus, a cyclic extended sequence may represent a (root) sequence and at least a part repetition of the (root) sequence. Operations described may be combined, in any order, in particular a shift and a cyclic extension. A cyclic shift in a domain may comprise shifting the sequence in the domain within an interval, such that the total number of sequence elements is constant, and the sequence is shifted as if the interval represented a ring (e.g., such that starting from the same sequence element, which may appear at different location in the interval), the order of elements is the same if the borders of the intervals are considered to be continuous, such that leaving one end of the interval leads to entering the interval at the other end). Processing and/or operating on with a code may correspond to constructing a sequence out of copies of a root sequence, wherein each copy is multiplied and/or operated on with an element of the code. Multiplying with an element of a code may represent and/or correspond to a shift (e.g., constant, or linear or cyclic) in phase and/or frequency and/or time domain, depending on representation. In the context of this disclosure, a sequence being based on and/or being constructed and/or processed may be any sequence that would result from such construction or processing, even if the sequence is just read from memory. Any isomorphic or equivalent or corresponding way to arrive at the sequence is considered to be included by such terminology; the construction thus may be considered to define the characteristics of the sequence and/or the sequence, not necessarily a specific way to construct them, as there may be multiple equivalent ways that are mathematically equivalent. Thus, a sequence "based on" or "constructed" or similar terminology may be considered to correspond to the sequence being "represented by" or "may be represented by" or "representable as".

A root sequence for a signaling sequence associated to one allocation unit may be basis for construction of a larger sequence. In this case, the larger sequence and/or the root sequence basis for its construction may be considered root sequence for signaling sequences associated to other allocation units.

For OFDM or SC-FDM, each element of a signaling sequence may be mapped to a subcarrier; in general, for SC-based signaling, a corresponding mapping in time domain may be utilised (such that each element may use essentially the full synchronisation bandwidth). A signaling sequence may comprise (ordered) modulation symbols, each modulation symbol representing a value of the sequence it is based on, e.g. based on the modulation scheme used and/or in a phase or constellation diagram; for some sequences like Zadoff-Chu sequences, there may be a mapping between non-integer sequence elements and transmitted waveform, which may not be represented in the context of a modulation scheme like BPSK or QPSK or higher.

A signaling sequence of an allocation unit may be based on a sequence root, e.g. a root sequence. A sequence root in general may represent or indicate a base for deriving or determining a signaling sequence; the root may be associated to, and/or represent a sequence directly, and/or indicate or represent a base sequence and/or seed. Examples of sequence roots may comprise a Zadoff Chu root sequence, a sequence seed, e.g. a seed for a Gold sequence, or a Golay complimentary sequence. A signaling sequence may be derived or derivable from, and/or be based on, a sequency root, e.g. based on a code, which may represent a shift or operation or processing on the root sequence or a sequence indicated by the sequence root, e.g. to provide the signaling sequence; the signaling sequence may be based on such shifted or processed or operated on root sequence. The code may in particular represent a cyclic shift and/or phase shift and/or phase ramp (e.g., an amount for such). The code may assign one operation or shift for each allocation unit.

In general, a signaling sequence associated to an allocation unit (and/or the allocation units) associated to control signaling (and/or reference signaling) may be based on a root sequence which may be a M-sequence or Zadoff-Chu sequence, or a Gold or Golay sequence, or another sequence with suitable characteristics regarding correlation and/or interference (e.g., self-interference and/or interference with other or neighboring transmitters). Different sequences may be used as root sequences for different signaling sequences, or the same sequence may be used. If different sequences are used, they may be of the same type (Gold, Golay, M- or Zadoff-Chu, for example). The (signaling and/or root) sequences may correspond to or be time-domain sequences, e.g. time domain Zadoff-Chu and/or time-domain M sequences.

In some cases, a shifted object like a signaling or signals or sequences or information may be shifted, e.g. relative to a predecessor (e.g., one is subject to a shift, and the shifted version is used), or relative to another (e.g., one associated to one signaling or allocation unit may be shifted to another associated to a second signaling or allocation unit, both may be used). One possible way of shifting is operating a code on it, e.g. to multiply each element of a shifting object with a factor. A ramping (e.g. multiplying with a monotonously increasing or periodic factor) may be considered an example of shifting. Another is a cyclic shift in a domain or interval. A cyclic shift (or circular shift) may correspond to a rearrangement of the elements in the shifting object, corresponding to moving the final element or elements to the first position, while shifting all other entries to the next position, or by performing the inverse operation (such that the shifted object as the result will have the same elements as the shifting object, in a shifted but similar order). Shifting in general may be specific to an interval in a domain, e.g. an allocation unit in time domain, or a bandwidth in frequency domain. For example, it may be considered that signals or modulation symbols in an allocation unit are shifted, such that the order of the modulation symbols or signals is shifted in the allocation unit. In another example, allocation units may be shifted, e.g. in a larger time interval—this may leave signals in the allocation units unshifted with reference to the individual allocation unit, but may change the order of the allocation units. Domains for shifting may for example be time domain and/or phase domain and/or frequency domain. Multiple shifts in the same domain or different domains, and/or the same interval or different intervals (differently sized intervals, for example) may be performed.

Reference signaling may have a type. Types of reference signaling may include synchronisation signaling, and/or DM-RS (used to facilitate demodulation of associated data signaling and/or control signaling), and/or PT-RS (used to facilitate phase tracking of associated data signaling and/or control signaling, e.g. within a time interval or symbol or allocation unit carrying such signaling), and/or CSI-RS (e.g., used for channel estimation and/or reporting). It may be considered that PT-RS are inserted into a bit sequence, or a modulation symbol sequence, which may represent data. For example, PT-RS may be mapped onto subcarriers of a symbol also carrying data symbols. Accordingly, PT-RS insertion may be optimised for hardware implementations. In some cases, PT-RS may be modulated differently and/or independently of the modulation symbols representing data (or data bits).

A comb structure, or short comb, may indicate a distribution, or periodic arrangement of reference signaling, in particular in frequency space, e.g. between an upper and lower frequency. A comb may pertain to one FDMA symbol and/or one (the same) symbol time interval or allocation unit. A comb may have width or size N and/or may pertain to, and/or be associated to, specific signaling and/or a type of signaling, e.g. a type of reference signaling. The width N may indicate how many empty subcarriers are between (e.g., non-neighbouring) subcarriers carrying an element or signal or symbol of the signaling (e.g., this number may be N−1), or how many empty subcarriers and non-empty subcarriers form a pattern that is repeated in frequency domain. In general, each comb may indicate that at least one empty subcarrier is to be between non-empty subcarriers. In this context, empty may refer to empty regarding the pattern or distribution of the signaling associated to the comb (and non-empty may refer to a subcarrier carrying an element or symbol of the associated signaling); in some cases, other signalings (which may have a comb structure as well) may be carried on empty subcarriers, e.g. transmitted using other transmission sources and/or other devices, and/or mapped into the comb (e.g., for a DMRS comb, data signaling may be mapped on subcarriers not carrying DMRS). A comb structure may generally describe a structure in which for every N-th (N may be an integer) resource element and/or subcarrier a reference signal or an element of a sequence of the reference signaling, and/or representing the reference signaling, and/or on which the reference signaling is based, is mapped to, and/or represented by signaling the resource element and/or subcarrier, in particular an element (symbol) of a modulation symbol sequence, or an element of a sequence. N may be called the width of the comb. Generally, the comb may indicate the periodicity of the pattern inside the frequency range of the reference signaling. The pattern may in particular pertain to one reference signal and/or resource element or subcarrier for transmitting a reference signal, such that the comb may be considered to indicate that on every N-th resource element (in particular, only there) and/or subcarrier there is to be a reference signal or element of an associated sequence, and/or how many resource elements and/or subcarriers are between resource elements and/or subcarriers with reference signals. However, there may be considered variants, in which the pattern represents more than one reference signals. The pattern may also generally represent and/or indicate one or more empty signals and/or one or more data signals (respectively associated resource elements and/or subcarriers). For each comb or comb structure with a width of N, there may be N or f(N) different available individual combs. For example, for N=2, there may be two combs shifted in frequency space by one, or an odd number, of subcarriers (e.g., based on a frequency domain offset, or a subcarrier offset). A comb structure or comb of width of N may be indicated as N-comb. Specific combs of this width may be numbered within N. For example, for a 2-comb, there may be a comb 1 (or C1) and a comb 2 (or C2), which may be shifted relative to each other, e.g. to dovetail such that all subcarrier covered by both combs carry signaling (associated to C1 and C2 alternatingly in frequency domain).

A comb may comprise two or more, for example at least three or at least four, repetitions of the pattern. The comb may indicate a reference and/or indication, e.g. a resource element and/or subcarrier, which may be related to the upper and/or lower boundary in frequency, regarding the arrangement and/or location in frequency of a first pattern, and/or the relative shift of the pattern and/or comb in frequency. Generally, a comb structure may cover at least part, and/or at least the majority, and/or essentially all or all resource elements and/or subcarriers of the plurality of resource elements and/or subcarriers, and/or the symbol.

A comb structure may result from combining two comb structures, which may in particular comb structures with pattern comprising only one reference signal. A comb structure may be determined and/or amended before transmission, e.g. based on other reference signaling to be transmitted, e.g. on a different antenna port. In this context, reference signals may be replaced by empty signals to avoid overlap and/or interference. Generally, if the other reference signaling utilises a comb structure as well, a different/new comb (as a combination of combs) may be considered to be determined, e.g. with less dense reference signal distribution and/or a different/wider pattern. Alternatively, or additionally, combs may be combined to increase the reference signal density, e.g. by combining combs with different widths, and/or with shifted offsets.

Generally, a comb structure may represent and/or comprise and/or be comprised of any of the combs/comb structures described herein.

In general, a clear channel assessment (CCA) procedure may comprise monitoring and/or performing measurements on a frequency range and/or channel and/or carrier and/or spectrum; in some cases a CCA procedure may also be referred to as LBT procedure; e.g., if only one CCA is performed for a LBT procedure. In particular, the CCA procedure may comprise determining whether a channel or frequency range or spectrum or carrier is occupied, for example based on one or more parameters, e.g. measured or monitored energy and/or power and/or signal strength and/or energy density and/or power density or similar. A CCA procedure may be performed and/or pertain to a specific time interval (also referred to as CCA duration), for example a measuring or monitoring interval over which measurement and/or monitoring is performed. The CCA procedure may be performed and/or pertain to a specific frequency range (also referred to as CCA frequency range), for example a measurement and/or monitoring range. The CCA frequency range may be part of and/or comprise the frequency range and/or carrier and/or spectrum and/or channel to be accessed (which may be referred to as access target frequency range, or access target in short; accessing in this context may be considered to refer to transmitting signaling on the range and/or carrier and/or spectrum). The CCA frequency range may be considered representative of the access target frequency range in terms of occupation status (occupied or non-occupied). A CCA procedure may indicate whether the access target is occupied or not, for example by comparing measurement results with one or more threshold values. For example, if the measured power or energy over the CCA duration is lower than an occupancy threshold, the access target may be considered unoccupied; if it reaches or is higher than the threshold, it may be considered occupied. A determination as unoccupied may be considered a positive result; a determination of occupied may be considered a negative result. A Listen-Before-Talk procedure (LBT) may comprise one or more CCA procedure in an LBT time interval, for example with the same duration and/or same condition or threshold for positive result, or with different durations and/or different conditions or thresholds. An LBT procedure may be considered positive if a threshold number of CCAs of the LBT procedure are positive, for example each or half, and/or a minimum consecutive in time are positive. A positive LBT and/or CCA procedure may allow access to the access target for transmission, for example to be accessed within an access time interval. Access (permission to transmit) may be valid for a channel occupation time (COT); the maximum time of access may be a maximum COT (M-COT). The time of access may be referred to as transmission duration (which may be as long as the M-COT or shorter). A radio node like a wireless device does not have to transmit the whole M-COT after successful CCA/LBT. It may be considered that part of the M-COT is passed on to another device, which then may transmit (using the rest of the M-COT), e.g. upon and/or based on suitable control signaling; this may be particularly useful in a centralised system. For example, in centralised system, a base station may initiate an access, transmit DL signaling to a wireless device scheduled for UL transmission such that the wireless device transmits within the M-COT after the DL transmission has ended, e.g. due to suitable scheduling information. The device performing successful access to start transmission at the beginning of a M-COT or COT may be considered the device initiating a COT or M-COT. Depending on whether there is a gap between transmissions of different device, one or more CCA procedures (in particular, shorter in total than for initiation) may have to be performed by the device taking over transmission. If a LBT procedure was unsuccessful, a device may be required to backoff (e.g., not trying to access for a backoff time interval, which may be predefined or random). Accessing and/or transmitting on an access target frequency range may comprise on the whole bandwidth of the frequency range, or on part of it, for example interleaved and/or in a contiguous part and/or utilising frequency hopping, and/or may be based on allocated and/or scheduled and/or configured resources, for example in time domain (e.g., for a number of symbols or a time interval) and/or frequency domain (e.g., as in terms of frequency subranges and/or subcarriers and/or PRBs and/or groups of PRBs assigned for transmission, e.g. allocated or scheduled or configured).

A transmission source may in particular comprise, and/or be represented by, and/or associated to, an antenna or group of antenna elements or antenna subarray or antenna array or transmission point or TRP or TP (Transmission Point) or access point. In some cases, a transmission source may be represented or representable, and/or correspond to, and/or associated to, an antenna port or layer of transmission, e.g. for multi-layer transmission. Different transmission sources may in particular comprise different and/or separately controllable antenna element/s or (sub-)arrays and/or be associated to different antenna ports and/or ports for reference signaling (e.g., such that reference signaling on different ports is shifted relative to each other, e.g. in code domain and/or cyclic shift and/or frequency domain and/or time domain, and/or is based and/or represents a different sequence root). In particular, analog beamforming may be used, with separate analog control of the different transmission sources. An antenna port may indicate a transmission source, and/or a one or more transmission parameter, in particular of reference signaling associated to the antenna port. In particular, transmission parameters pertaining to, and/or indicating a frequency domain distribution or mapping (e.g., which comb to use and/or which subcarrier or frequency offset to use, or similar) of modulation symbols of the reference signaling, and/or to which cyclic shift to use (e.g., to shift elements of a modulation symbol sequence, or a root sequence, or a sequence based on or derived from the root sequence) and/or to which cover code to use (e.g., (e.g., to shift elements of a modulation symbol sequence, or a root sequence, or a sequence based on or derived from the root sequence). In some cases, a transmission source may represent a target for reception, e.g. if it is implemented as a TRP or AP (Access Point).

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11 ay. While described variants may pertain to certain Technical Specifications (TSs) of the Third Generation Partnership Project (3GPP), it will be appreciated that the present approaches, concepts, and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
|---|---|
| ACK/NACK | Acknowledgment/Negative Acknowledgement |
| ARQ | Automatic Repeat reQuest |
| BER | Bit Error Rate |
| BLER | Block Error Rate |
| BPSK | Binary Phase Shift Keying |
| BWP | Bandwidth Part |
| CAZAC | Constant Amplitude Zero Cross Correlation |
| CB | Code Block |
| CBG | Code Block Group |
| CDM | Code Division Multiplex |
| CM | Cubic Metric |
| CORESET | Control Resource Set |
| CP | Cyclic Prefix |
| CPE | Common Phase Error |
| CQI | Channel Quality Information |
| CRC | Cyclic Redundancy Check |
| CRS | Common reference signal |
| CSI | Channel State Information |
| CSI-RS | Channel state information reference signal/ing |
| CW | Codeword, encoded and/or modulated information, e.g. in a data block |
| DAI | Downlink Assignment Indicator |
| DCI | Downlink Control Information |
| DFT | Discrete Fourier Transform |
| DFTS-FDM | DFT-spread-FDM |
| DM(—)RS | Demodulation reference signal(ing) |
| eMBB | enhanced Mobile BroadBand |
| EPRE | Energy Per Resource Element |
| FDD | Frequency Division Duplex |
| FDE | Frequency Domain Equalisation |
| FDF | Frequency Domain Filtering |
| FDM | Frequency Division Multiplex |
| FR1 | Frequency Range 1, e.g. as specified by NR |
| FR2 | Frequency Range 2, e.g. as specified by NR |
| HARQ | Hybrid Automatic Repeat Request |
| IAB | Integrated Access and Backhaul |
| ICI | Inter Carrier Interference |
| IFFT | Inverse Fast Fourier Transform |
| IR | Impulse Response |
| ISI | Inter Symbol Interference |
| MBB | Mobile Broadband |
| MCS | Modulation and Coding Scheme |
| MIMO | Multiple-input-multiple-output |

-continued

| Abbreviation | Explanation |
|---|---|
| MRC | Maximum-ratio combining |
| MRT | Maximum-ratio transmission |
| MU-MIMO | Multiuser multiple-input-multiple-output |
| NR | 3GPP New Radio system |
| NR-RS | NR Reference Signal (any type) |
| OCC | Orthogonal Cover Code |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PN | Phase Noise |
| PRACH | Physical Random Access CHannel |
| PRB | Physical Resource Block |
| (P)SCCH | (Physical) Sidelink Control Channel |
| PSD | Power Spectral Density |
| PSS | Primary Synchronisation Signal(ing) |
| (P)SSCH | (Physical) Sidelink Shared Channel |
| PTRS | Phase Tracking RS |
| PUCCH | Physical Uplink Control Channel |
| PUSCH | Physical Uplink Shared Channel |
| QAM | Quadrature Amplitude Modulation |
| QPSK | Quadrature Phase Shift Keying |
| RAN | Radio Access Network |
| RAT | Radio Access Technology |
| RB | Resource Block |
| RNTI | Radio Network Temporary Identifier |
| RRC | Radio Resource Control |
| RS | Reference Signal |
| RSRP | Received Signal Receive Power |
| RSRQ | Received Signal Received Quality |
| RX | Receiver, Reception, Reception-related/side |
| SA | Scheduling Assignment |
| SC-FDE | Single Carrier Frequency Domain Equalisation |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SSS | Secondary Synchronisation Signal(ing) |
| SVD | Singular-value decomposition |
| TB | Transport Block |
| TCI | Transmission Configuration Indicator |
| TDD | Time Division Duplex |
| TDM | Time Division Multiplex |
| TRP | Transmission Point, Transmission/Reception Point |
| TRS | Tracking RS |
| TX | Transmitter, Transmission, Transmission-related/side |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |
| ZP | Zero-Power, e.g. muted CSI-RS symbol |

Abbreviations may be considered to follow 3G PP usage if applicable.

The invention claimed is:

1. A method of operating a receiving radio node in a wireless communication network, the method comprising:
receiving signaling based on evaluating Phase Tracking Reference Signaling, PTRS, associated to the signaling, the evaluating including assuming a power level of PTRS relative to associated data signaling based at least in part on (a) a number of PTRS ports transmitted with a physical downlink shared channel, PDSCH, and (b) a number of multiple input-multiple output, MIMO, layers associated with each port, a power level of the PTRS being allocated from a muted resource element to increase PTRS transmit power while keeping a same average PDSCH transmit power and while keeping a same total transmit power level for transmitting both the PDSCH and the PTRS.

2. The method according to claim 1, wherein the relative power level of the PTRS corresponds to a transmission power level.

3. The method according to claim 1, wherein the relative power level of the PTRS is dependent on one or more Modulation and Coding Schemes associated to the signaling.

4. The method according to claim 1, wherein the relative power level of the PTRS is in conformance with a table.

5. The method according to claim 1, wherein the relative power level of the PTRS is indicated by Energy Per Resource Element, EPRE.

6. A receiving radio node for a wireless communication network, the receiving radio node configured to:
receive signaling based on evaluating Phase Tracking Reference Signaling, PTRS, associated to the signaling, the evaluating including assuming a power level of PTRS relative to associated data signaling based at least in part on at least one of (1) a number of PTRS ports transmitted with a physical downlink shared channel, PDSCH, and (b) a number of multiple input-multiple output, MIMO, layers associated with each port, a power level of the PTRS being allocated from a muted resource element to increase PTRS transmit power while keeping a same average PDSCH transmit power and while keeping a same total transmit power level for transmitting both the PDSCH and the PTRS.

7. A method of operating a transmitting radio node in a wireless communication network, the method comprising:
transmitting signaling comprising Phase Tracking Reference Signaling, PTRS, a power level of the PTRS relative to associated data signaling based at least in part on (a) a number of PTRS ports transmitted with a physical downlink shared channel, PDSCH, and (b) a number of multiple input-multiple output, MIMO, layers associated with each port, a power level of the PTRS being allocated from a muted resource element to increase PTRS transmit power while keeping a same average PDSCH transmit power and while keeping a same total transmit power level for transmitting both the PDSCH and the PTRS.

8. The method according to claim 7, wherein the relative power level of the PTRS corresponds to a transmission power level.

9. The method according to claim 7, wherein the relative power level of the PTRS is dependent on one or more Modulation and Coding Schemes associated to the signaling.

10. The method according to claim 7, wherein the relative power level of the PTRS is in conformance with a table.

11. The method according to claim 7, wherein the relative power level of the PTRS is indicated by Energy Per Resource Element, EPRE.

12. A transmitting radio node for a wireless communication network, the transmitting radio node being configured to:
transmit signaling comprising Phase Tracking Reference Signaling, PTRS, a power level of the PTRS relative to associated data signaling based at least in part on (a) a number of PTRS ports transmitted with a physical downlink shared channel, PDSCH, and (b) a number of multiple input-multiple output, MIMO, layers associated with each port, a power level of the PTRS being allocated from a muted resource element to increase PTRS transmit power while keeping a same average PDSCH transmit power and while keeping a same total transmit power level for transmitting both the PDSCH and the PTRS.

13. A non-transitory computer storage medium storing a computer program comprising instructions causing processing circuitry to at least one of control and perform a method of operating a receiving radio node in a wireless communication network, the method comprising:

receiving signaling based on evaluating Phase Tracking Reference Signaling, PTRS, associated to the signaling, the evaluating including assuming a power level of PTRS relative to associated data signaling based at least in part on (a) a number of PTRS ports transmitted with a physical downlink shared channel, PDSCH, and (b) a number of multiple input-multiple output, MIMO, layers associated with each port, a power level of the PTRS being allocated from a muted resource element to increase PTRS transmit power while keeping a same average PDSCH transmit power and while keeping a same total transmit power level for transmitting both the PDSCH and the PTRS.

* * * * *